(12) United States Patent
Applegate et al.

(10) Patent No.: US 11,863,542 B2
(45) Date of Patent: Jan. 2, 2024

(54) SYSTEMS AND METHODS FOR USING SPI TO DISCOVER A NETWORK GRAPH OF NODES BEHIND NAT

(71) Applicant: CradlePoint, Inc., Boise, ID (US)

(72) Inventors: Doug Applegate, Meridian, ID (US); Kurt Ziegler, Boise, ID (US)

(73) Assignee: CradlePoint, Inc., Boise, ID (US)

( * ) Notice: Subject to any disclaimer, the term of this patent is extended or adjusted under 35 U.S.C. 154(b) by 275 days.

(21) Appl. No.: 17/394,327

(22) Filed: Aug. 4, 2021

(65) Prior Publication Data

US 2023/0037548 A1 Feb. 9, 2023

(51) Int. Cl.
*H04L 9/40* (2022.01)
*H04L 61/256* (2022.01)

(52) U.S. Cl.
CPC ........ *H04L 63/0485* (2013.01); *H04L 61/256* (2013.01); *H04L 63/20* (2013.01)

(58) Field of Classification Search
CPC .... H04L 63/0485; H04L 63/20; H04L 61/256

USPC ............................................................ 726/1
See application file for complete search history.

(56) References Cited

U.S. PATENT DOCUMENTS

| | | | | |
|---|---|---|---|---|
| 7,181,612 B1* | 2/2007 | Pellacuru | ............ | H04L 63/0272 713/153 |
| 2005/0270986 A1* | 12/2005 | Watanabe | ............... | H04L 41/12 370/252 |
| 2007/0253418 A1* | 11/2007 | Shiri | ................... | H04L 65/1104 370/392 |
| 2008/0165964 A1* | 7/2008 | Lewis | ................. | H04L 63/0227 380/255 |
| 2010/0217971 A1* | 8/2010 | Radhakrishnan | ... | H04L 63/0272 713/153 |

* cited by examiner

*Primary Examiner* — Michael S McNally
(74) *Attorney, Agent, or Firm* — PARSONS BEHLE & LATIMER

(57) ABSTRACT

Systems and methods for determining network topology by implementing the security parameter index ("SPI") to map network nodes that are behind a network address translation ("NAT") address are disclosed.

8 Claims, 3 Drawing Sheets

SYSTEMS AND METHODS FOR USING SPI TO DISCOVER A NETWORK GRAPH OF NODES BEHIND NAT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE DISCLOSURE

This disclosure relates generally to computer networking. In particular, this disclosure relates to determining network topology by implementing the security parameter index ("SPI") to map network nodes that are behind a network address translation ("NAT") address.

BACKGROUND

Typically, the topology (i.e., arrangement and interrelation of constituent parts) of a network is determined at build time when the network is assembled. This build-time design makes it hard, or inefficient, to determine topologies of other networks such as, a dynamic multi-point virtual private network ("DMVPN") that can be configured dynamically and without a single builder.

Additionally, discovering the topology of nodes in a network is difficult when one or more nodes are behind NAT. Without NAT it is easy to compare node endpoints to determine connectivity between the nodes. However, this technique is extremely difficult and inefficient when one or more nodes in the network are behind NAT.

Other drawbacks, inefficiencies, and issues also exist with current systems and methods.

SUMMARY

Accordingly, the disclosed embodiments address the above, and other, drawbacks, inefficiencies, and issues that exist with current systems and methods.

Additionally, disclosed embodiments enable validating a network build or configuration process by separating it from the network discovery process. Thus, after building a particular network topology, the discovery process of disclosed embodiments validates that the resulting network is functioning as intended.

Disclosed embodiments include a system for mapping network topology, the system including a first networking device in communication with a network secured with Internet Protocol Security (IPsec) protocol, a management system in communication with the first networking device and configured to read a first SPI address assigned to the first networking device by the IPsec protocol, and a network map generated by an aggregation process executed by the management system wherein the aggregation process keeps track of the first SPI address assigned to the first networking device.

In some embodiments the system includes a second networking device in communication with the network and having a second SPI address assigned by the IPsec protocol, and wherein the aggregation process keeps track of the second SPI address assigned to the second networking device and determines if the first SPI address matches the second SPI address; and if a match is determined, updates the network map to show a connection between the first networking device and the second networking device.

In some embodiments, the first networking device is a network hub and the second networking device is a network spoke.

Also disclosed are methods for mapping network topology including assigning a first SPI address using an IPsec protocol to a first networking device in communication with a network, communicating with the first networking device with a management system configured to read the first SPI address assigned to the first networking device by the IPsec protocol, and generating a network map with an aggregation process executed by the management system wherein the aggregation process keeps track of the first SPI address assigned to the first networking device.

In some embodiments, the method includes assigning a second SPI address to a second networking device in communication with the network, and wherein the aggregation process keeps track of the second SPI address assigned to the second networking device and determines if the first SPI address matches the second SPI address, and if a match is determined, updates the network map to show a connection between the first networking device and the second networking device.

Other advantages, features, and embodiments also exist.

Figure 1:
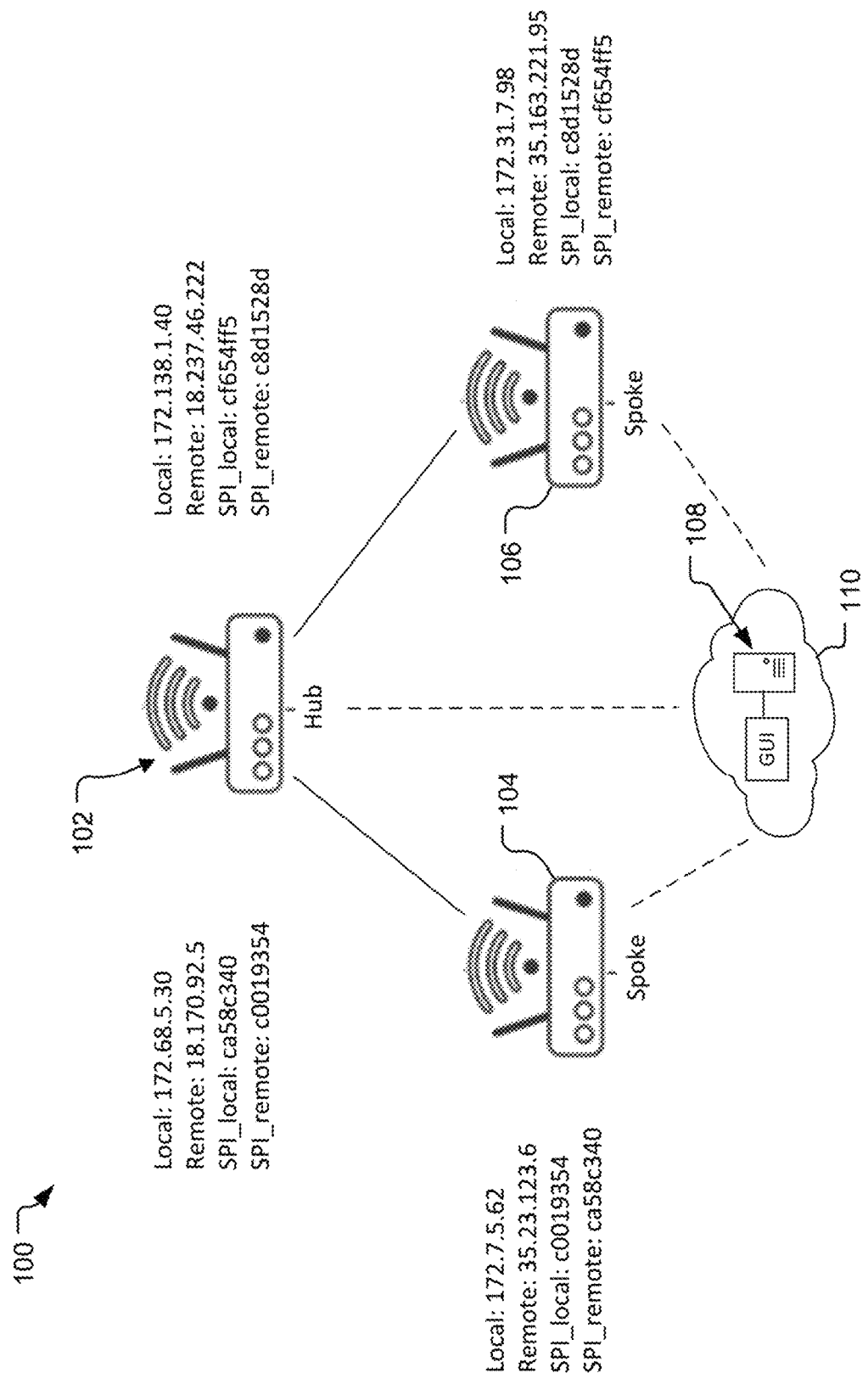
FIG. 1 is a schematic illustration of an environment for disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

In the following detailed description, numerous specific details are set forth to provide a thorough understanding of claimed subject matter. For purposes of explanation, specific numbers, systems and/or configurations are set forth, for example. However, it should be apparent to one skilled in the relevant art having benefit of this disclosure that claimed subject matter may be practiced without specific details. In other instances, well-known features may be omitted and/or simplified so as not to obscure claimed subject matter. While certain features have been illustrated and/or described herein, many modifications, substitutions, changes and/or equivalents may occur to those skilled in the art. It is, therefore, to be understood that appended claims are intended to cover any and all modifications and/or changes as fall within claimed subject matter.

Reference throughout this specification to one implementation, an implementation, one embodiment, an embodiment and/or the like may mean that a particular feature, structure, and/or characteristic described in connection with a particular implementation and/or embodiment may be included in at least one implementation and/or embodiment of claimed subject matter. Thus, appearances of such phrases, for example, in various places throughout this specification are not necessarily intended to refer to the same implementation or to any one particular implementation described. Furthermore, it is to be understood that particular features, structures, and/or characteristics described may be combined in various ways in one or more implementations.

Operations and/or processing, such as in association with networks, such as communication networks, for example, may involve physical manipulations of physical quantities. Typically, although not necessarily, these quantities may take the form of electrical and/or magnetic signals capable of, for example, being stored, transferred, combined, processed, compared and/or otherwise manipulated. It has proven convenient, at times, principally for reasons of common usage, to refer to these signals as packets, bits, data, values, elements, symbols, characters, terms, numbers, numerals and/or the like. It should be understood, however, that all of these and/or similar terms are to be associated with appropriate physical quantities and are intended to merely be convenient labels.

It should be understood that for ease of description a network device (also referred to as a networking device, networked device, and plurals of the same) may be embodied and/or described in terms of a computing device. However, it should further be understood that this description should in no way be construed that claimed subject matter is limited to one embodiment, such as a computing device or a network device, and, instead, may be embodied as a variety of devices or combinations thereof.

In this context, the term network device refers to any device capable of communicating via and/or as part of a network. While network devices may be capable of sending and/or receiving signals (e.g., signal packets), such as via a wired or wireless network, they may also be capable of performing arithmetic and/or logic operations, processing and/or storing signals, such as in memory as physical memory states, and/or may, for example, operate as a server in various embodiments. Network devices capable of operating as a server, or otherwise, may include, as examples, dedicated rack-mounted servers, desktop computers, laptop computers, set top boxes, tablets, netbooks, smart phones, integrated devices combining two or more features of the foregoing devices, the like or any combination thereof.

A network may comprise two or more network devices and/or may couple network devices so that signal communications, such as in the form of signal packets, for example, may be exchanged, such as between a server and a client device and/or other types of devices, including between wireless devices coupled via a wireless network, for example.

A network may also include now known, or to be later developed arrangements, derivatives, and/or improvements, including, for example, past, present and/or future mass storage, such as network attached storage (NAS), a storage area network (SAN), and/or other forms of computer and/or machine readable media, for example. A network may include the Internet, one or more local area networks (LANs), one or more wide area networks (WANs), wire-line type connections, wireless type connections, other connections, or any combination thereof. Thus, a network may be worldwide in scope and/or extent. Likewise, a network may include sub-networks, such as those that may employ differing architectures, or may be compliant and/or compatible with differing protocols, such as communication protocols (e.g., network communication protocols). In this context, the term sub-network refers to a portion or part of a network. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices, but without the communicating devices necessarily specifying one or more intermediate devices and/or may include communicating as if intermediate devices are not necessarily involved in communication transmissions. For example, a router may provide a link or connection between otherwise separate and/or independent LANs. In this context, a private network refers to a particular, limited set of network devices able to communicate with other network devices in the particular, limited set, such as via signal packet transmissions, for example, without a need for re-routing and/or redirecting such network communications. A private network may comprise a stand-alone network; however, a private network may also comprise a subset of a larger network, such as, for example, without limitation, the Internet. Thus, for example, a private network "in the cloud" may refer to a private network that comprises a subset of the Internet, for example. Although signal packet transmissions may employ intermediate devices to exchange signal packet transmissions, those intermediate devices may not necessarily be included in the private network by not being a source or destination for one or more signal packet transmissions. It is understood in this context that a private network may provide outgoing network communications to devices not in the private network, but such devices outside the private network may not direct inbound network communications to devices included in the private network.

The Internet refers to a decentralized global network of interoperable networks that comply with the Internet Protocol (IP). It is noted that there are several versions of the IP. Here, the term Internet Protocol or IP is intended to refer to any version, now known or later developed. The Internet includes LANs, WANs, wireless networks, and/or long-haul public networks that, for example, may allow signal packets to be communicated between LANs. The term world wide web (WWW) and/or similar terms may also be used, although it refers to a sub-portion of the Internet that complies with the Hypertext Transfer Protocol or HTTP. It is noted that there are several versions of the Hypertext Transfer Protocol. Here, the term Hypertext Transfer Protocol or HTTP is intended to refer to any version, now known or later developed. It is likewise noted that in various places in this document substitution of the term Internet with the term world wide web may be made without a significant departure in meaning and may, therefore, not be inappropriate in that the statement would remain correct with such a substitution.

Signal packets, also referred to as signal packet transmissions, may be communicated between nodes of a network, where a node may comprise one or more network devices and/or one or more computing devices. As an illustrative example, but without limitation, a node may comprise one or more sites employing a local network address. Likewise, a device, such as a network device and/or a computing device, may be associated with that node. A signal packet may, for example, be communicated via a communication channel or a communication path comprising the Internet, from a site via an access node coupled to the Internet. Likewise, a signal packet may be forwarded via network nodes to a target site coupled to a local network, for example. A signal packet communicated via the Internet, for example, may be routed via a path comprising one or more gateways, servers, etc that may, for example, route a signal packet in accordance with a target address and availability of a network path of network nodes to a target address. Although the Internet comprises a network of interoperable networks, not all of those interoperable networks are necessarily available or accessible to the public.

Typically, a network communications protocol has several layers. These layers may be referred to here as a network communication stack. Various types of network communications may occur across various layers. For example, as one moves higher in a network communication stack, additional operations may be available by transmitting network communications that are compatible and/or compliant with a particular network communications protocol at these higher layers.

A network may be very large, such as comprising thousands of nodes, millions of nodes, billions of nodes, or more, as examples. As the number of network devices communicating via a network grow, signals transmissions via a network, such as in the form of signal packets, for example, may begin to interfere. Thus, it may be desirable to create and/or generate a logical, private network, such as via (e.g., over) the Internet, to potentially limit the number of signal transmissions at least partially without necessarily limiting geographies, for example, by having portions of a logical, connected, secure private network in geographies of potential interest. In addition, it may be possible to purchase available capacity, such as memory and/or processing capacity of a third party, as examples, in separate markets, such as markets where costs may be more appealing, providing another potential benefit, as explained in more detail later. For example, applications, such as software applications, may execute above or on infrastructure, such as networking infrastructure and/or computing infrastructure, in a manner to provide capabilities, such as these as well as others. Thus, for example, one or more software applications may execute on computing and/or memory resources owned by a third party to create and/or generate a logical, private network for an entity other than the third party that owns the computing and/or memory resources, as explained in more detail later. In this context, networking infrastructure refers to conventional hardware and software that is deployed or deployable to provide networking functionality and/or network services without using or including components substantially in accordance with claimed subject. Likewise, in this context, computing infrastructure refers to conventional hardware and software that is deployed or deployable to provide computing functionality and/or services without using or including components substantially in accordance with claimed subject matter.

In this context, the terms cloud, cloud computing, cloud hosting and/or similar terms refers to is the use of network and/or computing resources (e.g., hardware), network and/or computing applications (e.g., software), or any combinations thereof delivered as a service over a network (typically the Internet), meaning here, in essence, the use of hardware and/or software owned by one or more third parties. A benefit of use of the cloud or cloud computing is that it permits someone, such as an entity, (e.g., a network provider, for example) to offer a product and/or service without necessarily owning the hardware and/or software, or at least large portions thereof. Thus, for example, a third-party handles obtaining power, purchasing equipment, renting space, obtaining connectivity, etc. An example, but not the only one, includes Amazon AWS, which, for example, owns and/or provides data centers with equipment, etc., it makes available to others, as described.

A network device comprises a device capable of communicating via a network, as mentioned. A computing device comprises a device capable of executing computations. Thus, for example, network devices may comprise computing devices, non-computing devices, and/or other devices. A network device may comprise, as non-limiting examples, a router, gateway, hub, switch, host, mobile device, server, client, a network address translation (NAT) device, the like, or any combinations thereof. A server, which may comprise a computing device, may also operate as network device, by serving content over a network. For example, a server may provide now known and/or to be later developed, service arrangements, derivatives, and/or improvements, including past, present, and/or future services comprising, but not limited to, web services, third-party services, audio services, video services, email services, instant messaging (IM) services, SMS services, MMS services, voice over IP (VOIP) services, calendaring services, photo services, database services, facsimile services, file services, domain name services, game services, printing services, proxy services, data streaming services, peer-to-peer services, other services, the like or any combinations thereof. Examples of content may include text, images, audio, video, the like, or any combinations thereof, which may be processed in the form of physical signals, such as electrical signals, for example, or may be stored in memory, as physical states, for example.

Likewise, available services via a network device may be determined based at least in part on which ports are open on a network device. Port scanning a network device may determine which ports may be open by transmitting signal packets to request a connection with a network device on a port. A network device may respond, for example, by transmitting signal packets indicating an available connection. See, for example, RFC 793-Transmission Control Protocol, available, for example, from the Internet Engineering Task Force (IETF), at www.ietf.org. Signal packets comprising responses may imply that a port may be available.

Because network port numbers may consistently map to known services, a network device monitoring these responses may at least in part discover which services may be available via other network devices. For example, an open port 20 or 21 may imply that an FTP service may be available. Additionally, SSH may be available via port 22, Telnet may be available via port 23, SMTP may be available via port 25, POP3 may be available via port 110, or HTTPS may be available via port 443, for example. As is known in the art, associations between port numbers and services may be consistent, or may change over time. As associations between port numbers and services evolve, it is intended that claimed subject matter include discovery of available services according to evolving industry standards. As in known in the art, port scanning may be accomplished via TCP scanning, SYN scanning, UDP scanning, ACK scanning, Window scanning, FIN scanning, or other scanning types or methods, as may be known in the art or may later be developed.

A network device may be associated with a node and a controller may be associated with another node. In one example, the network device and the controller may respectively be associated with separate nodes, the nodes being accessible via the Internet Thus, signal packet transmissions may be initiated from a network device to a controller, for example. In this example, a controller may comprise a mechanism for centralized management of a private network. For example, a controller may be implemented on a server. Typically, but not necessarily, a controller may exist virtually, and/or may comprise set instructions being executed via a device, such as a network device and/or computing device. Although a controller may appear to be available, the device may, in an embodiment, comprise a virtual device. For example, a software application may execute instructions such as a virtual device on or above a software stack of a physical device.

A network device, such as described in this example, typically may include a graphical user interface (GUI), so that rendering of the GUI may take place. Of course, any one of a host of mechanisms to accomplish this are possible. For example, a standard web browser may be employed to render a GUI. A GUI, for example, may be rendered on a network device and/or a computing device based at least in part on signal packet transmissions to the device that may be initiated by a controller, for example. Thus, a client-server model in which, for example, a controller serves content to a client may be employed to render a GUI on a network device via a conventional browser without a plug-in, for example. Alternately, a plug-in may be employed to facilitate rendering of a GUI. In still another possible embodiment, a device, such as a network device and/or computing device, may include native software to render a GUI. These, of course, are merely illustrative examples and claimed subject matter is not restricted in scope to these or any other particular approaches, now known or later developed, that may be employed to render a GUI on a device having a display, such as on a network device, for example. Although in this example, the Internet was discussed, in an alternative embodiment, of course, the network may comprise any network, such as a stand-alone private network, an intranet, a LAN, a WAN, etc. Thus, as alluded to previously, a device, such as a network device and/or a computing device, to manage a private network may be included within the private network but is not necessarily so.

Likewise, in addition to management of a private network, as described in more detail and illustrated, for example, a GUI may be employed in connection with virtual deployment of network services, resources and/or applications. For example, a GUI may be rendered giving a user of a private network an ability to request provisioning and/or removal of services, resources and/or applications, such as, for example, the previously described non-limiting set of examples. Likewise, although navigating a GUI by a user involves human activity to make a selection, after a user request is provided, such as via a GUI, provisioning and/or removal of requested services, resources and/or applications may take place without further human intervention.

In connection with monitoring network traffic various parameters may be measured. As a non-limited list of examples, average throughput in a particular unit of time, real-time through put, average utilization in a particular unit of time, real-time utilization, average latency in a particular unit of time and/or real-time latency of network communication packets may be monitored and/or measured. In addition, measurements may be taken over different routes, over a complete loop, over the entire private network, over sub-networks, over a logical broadcast domain, between any two or more nodes, etc. These are just a few examples of the almost limitless set of measurements that may be computed for a private network. Likewise, therefore, an embodiment may also include a capability to reconfigure the private network without human intervention to improve network performance and/or to reduce network cost and/or a capability to reconfigure the private network including reallocation of network resources and/or geographical reconfiguration of the private network, such as substantially in accordance with various measured network performance and/or cost parameters so as to result in adjustment and/or tuning thereof.

FIG. 1 is a schematic illustration of an environment for disclosed embodiments. As shown a network 100, such as a DMVPN, may be created through wireless connection of a number of network devices 102, 104, 106. As shown, network device 102 may be configured as a hub for network 100 and network devices 104, 106 may be configured as spokes. As those of ordinary skill in the art having the benefit of this disclosure would understand, other configurations are also possible.

Network 100 may also be secured with Internet Protocol Security (IPsec) which is a network protocol suite that authenticates and encrypts the packets of data sent over a network. IPsec includes protocols for establishing mutual authentication between agents at the beginning of the session and negotiation of cryptographic keys for use during the session. Most networks of interest include IPsec. IPsec adds a Security Parameter Index (SPI) to the packet header that uniquely identifies the connection. Because the nodes on both sides of the tunnel see this packet, SPI can be used to connect the nodes in a network graph, independent of the endpoint IP address. As those of ordinary skill in the art having the benefit of this disclosure would understand, the herein disclosed concepts can be extended to any technology or protocol that provides a unique identifier for a connection that is known on both sides of a tunnel and can serve the same purpose as disclosed herein.

IPsec will assign network devices 102, 104, 106 an SPI_local and SPI_remote address as indicated on FIG. 1. Likewise, as indicated on FIG. 1, NAT local and remote address are assigned for the network device 102, 104, 106. As indicated, the hub 102 local and remote addresses do not match up with the corresponding spoke 104 and spoke 106 remote and local addresses. In other words, hub 102 NAT local address (172.68.5.30) does not correspond to spoke 104 NAT remote address (35.23.123.6) and, likewise, the hub 102 NAT remote address (18.170.92.5) does not correspond to spoke 104 NAT local address (172.7.5.62). The same holds true for communications between hub 102 and spoke 106.

However, as indicated on FIG. 1, the SPI_local and SPI_remote address between hub 102 and spokes 104 and 106 do correspond. For example, hub 102 SPI_local address (ca58c340) does correspond to spoke 104 SPI_remote address (ca58c340) and hub 102 SPI_remote address (c0019354) corresponds to spoke SPI_local address (c0019354). The same is true for communications between hub 102 and spoke 106.

As also indicated on FIG. 1, network 100 may also include an Internet-based 110, cloud management system 108, such as NetCloud™ Manager provided by Cradlepoint, Inc., of Boise, ID, and that comprises a cloud-based, software-as-a-service (SaaS) platform to enable a user to access a management system 108 and use a GUI or the like to manage network devices 102, 104, 106 over the Internet 110. In some embodiments, the management system 108 and GUI, or the like, to manage network devices 102, 104, 106 need not be Internet-based and may be displayed on a local computing device in communication with network devices 102, 104, 106.

Figure 2:
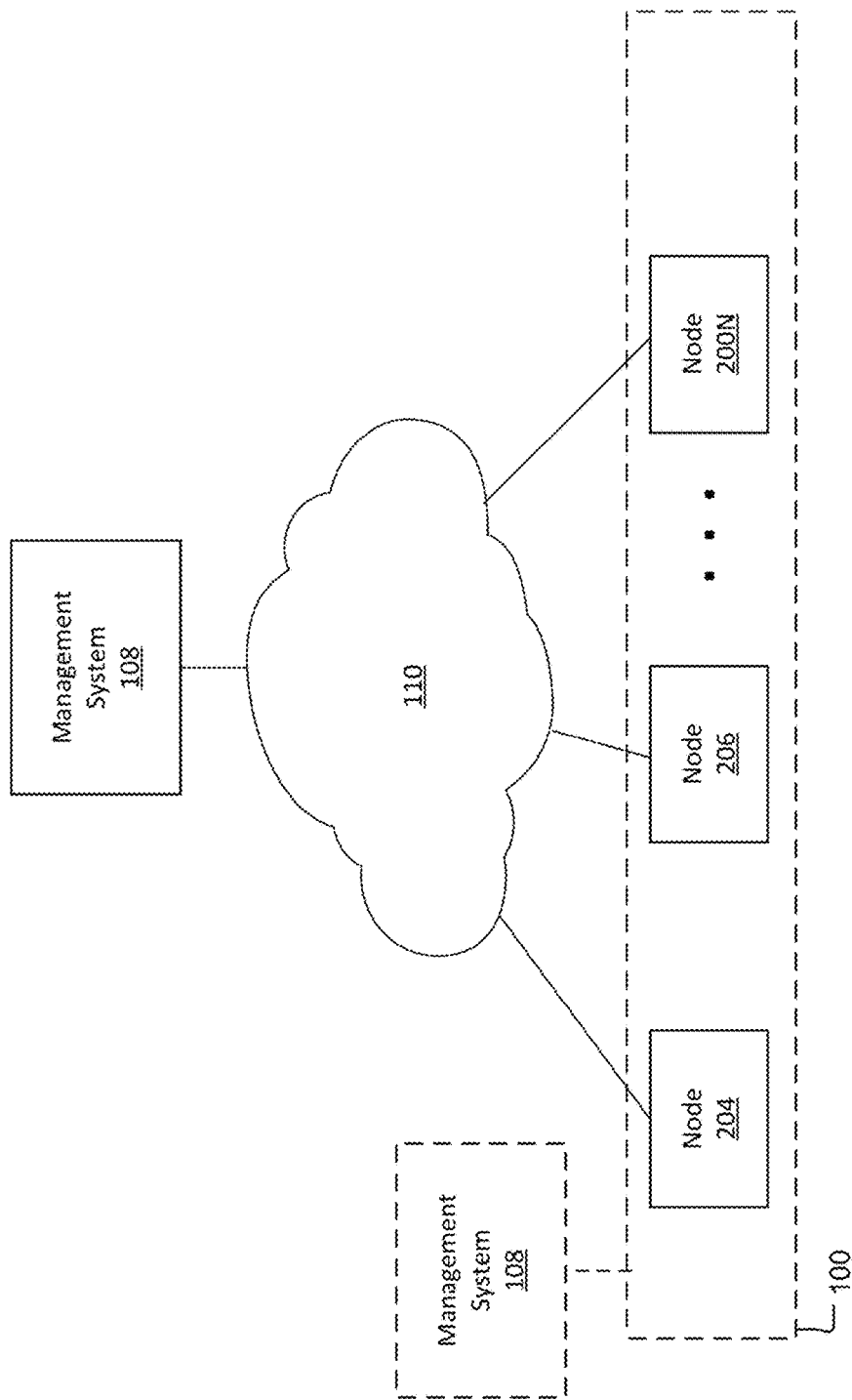
FIG. 2 is a schematic illustration of aggregating network 100 information to draw a network map in accordance with disclosed embodiments.

FIG. 2 is a schematic illustration of aggregating network 100 information to draw a network map in accordance with disclosed embodiments. As indicated schematically, network 100 may comprise a number of nodes 204, 206, . . . , 200N. Each node 204, 206, . . . , 200N, may comprise a network device 102, 104, 106, communicating over network 100. Behind each network device there may be one or more client computing devices (e.g., laptops, desktops, smartphones, tablets, etc.) As indicated schematically, each node 204, 206, . . . , 200N communicates either locally or over the Internet 110 with management system 108 to provide its SPI information for each of its connections. Management system 108 executes an aggregation process that keeps track of SPI that each node 204, 206, . . . , 200N reported to it. When a new node arrives or reports, the SPI for each connection is compared with the SPI of every other known connection. If a match is found, the two nodes containing the matching SPIs are considered connected. A network 100 map can then be drawn and displayed to a user of management system 108.

Below is exemplary pseudocode for embodiments of that aggregation of SPI information:

```
report_node( ):
    spis = [ ]
    node = {"spis": spis}
    for each connection in connections:
        spis.append(connection.spi)
    aggregate_nodes(node)
nodes = [ ]
aggregate_nodes(new_node):
    connected = false
    for each node in nodes:
        for each spi in node.spis:
            for each new_spi in new_node.spis:
                if spi == new_spi:
                    connected = true
    nodes.append(new_node)
    return connected.
```

Figure 3:
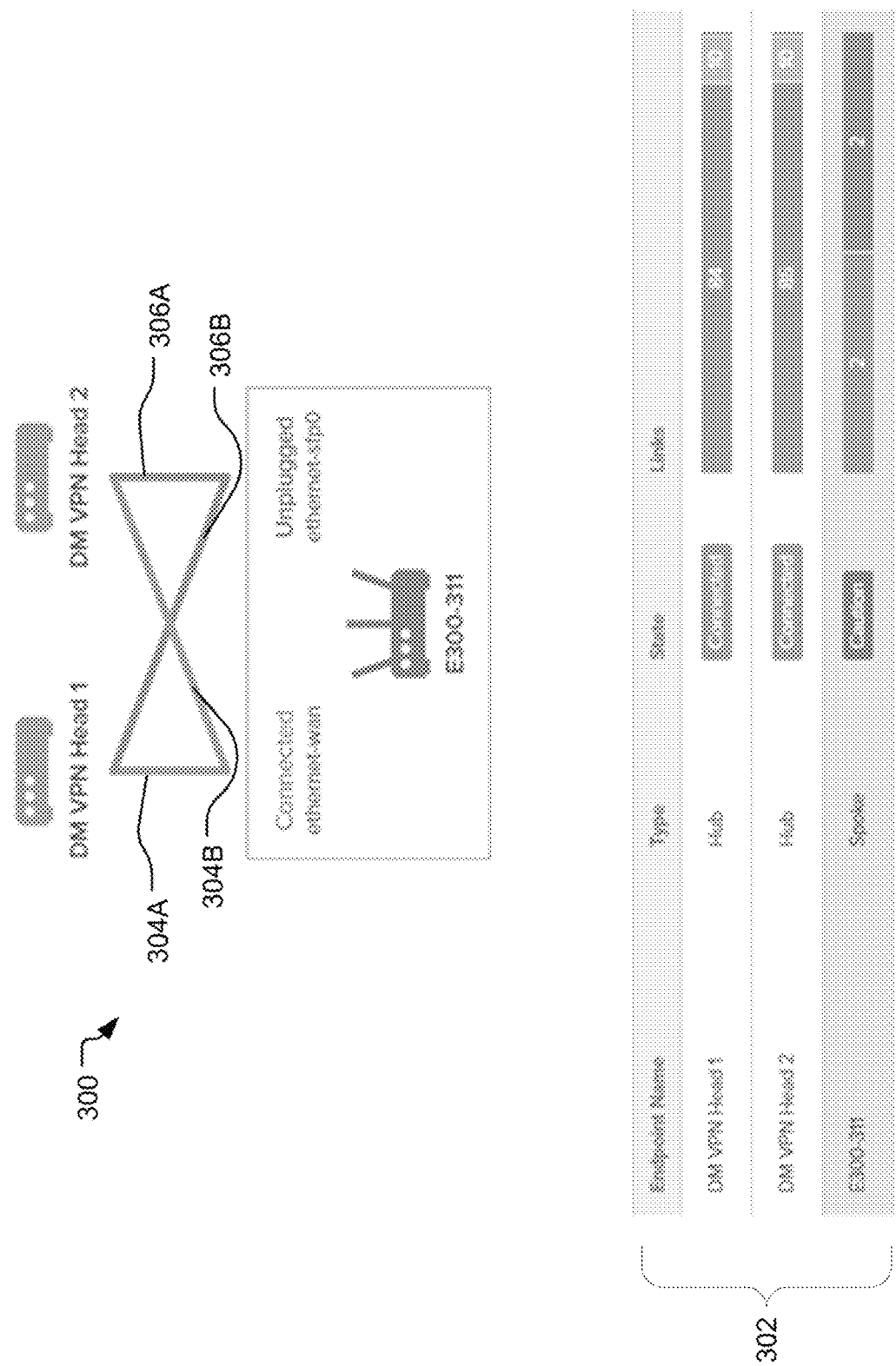
FIG. 3 is an example network map 300 in accordance with disclosed embodiments.

FIG. 3 is an example network map 300 in accordance with disclosed embodiments. As indicated, a network device E300-311 (shown as an endpoint router) is selected in a GUI or the like of management system 108 to draw and display network map 300. As indicated, the management system 108 may also display a table or other text information 302 corresponding to map 300 display.

As also shown on map 300, connections to network device E300-311 are displayed as connection 304A to DMVPN head 1 and 304B to head 2 and connection 306A to DMVPN head 2 and 306B to head 1 which shows that two WANs are each connected to two hubs (head 1 and head 2). As disclosed herein, SPI information is used to figure out the connections. Each connection 304A, 304B, 306A, 306B is a link that represents (among other things) an IPsec connection, each end of each link contains matching SPIs that are used by the management system 108 to connect the spoke (e.g., network device E300-311) to the two different hubs (head 1 and head 2). As shown, when a spoke (e.g., network device E300-311) has two WANS we get two independent connections to the same hub such as 304A and 306B to head 1 and 304B and 306A to head 2. Such a configuration can be desirable for, among other things, redundancy and traffic load balancing. Network map 300 may show both sets of links (304A, 304B, 306A, 306B) in the diagram because each includes status information useful for debugging and the like if a link goes down. As shown schematically on network map 300, words, colors, shading, dashes, or the like, can indicate the link(s) traffic is flowing on (e.g., links 304A and 304B are indicated as "connected" and links 306A and 306B are indicated as "unplugged"). As those in the art having the benefit of this disclosure would understand, there is no technical limit to the number of WANS or head-end routers and a spoke will typically have a total number links equal to the number of WANS multiplied by the number of head-ends. Other configurations are also possible.

Although various embodiments have been shown and described, the present disclosure is not so limited and will be understood to include all such modifications and variations would be apparent to one skilled in the art.

What is claimed is:

1. A system for mapping network topology, the system comprising:
    a first networking device in communication with a network secured with Internet Protocol Security (IPsec) protocol;
    a management system in communication with the first networking device and configured to read a first SPI address assigned to the first networking device by the IPsec protocol; and
    a network map generated by an aggregation process executed by the management system wherein the aggregation process keeps track of the first SPI address assigned to the first networking device.

2. The system of claim 1 further comprising:
    a second networking device in communication with the network and having a second SPI address assigned by the IPsec protocol; and
    wherein the aggregation process keeps track of the second SPI address assigned to the second networking device and determines if the first SPI address matches the second SPI address; and if a match is determined, updates the network map to show a connection between the first networking device and the second networking device.

3. The system of claim 2 wherein the first networking device comprises a network hub.

4. The system of claim 2 wherein the second networking device comprises a network spoke.

5. A method for mapping network topology, the method comprising:
    assigning a first SPI address using an Internet Protocol Security (IPsec) protocol to a first networking device in communication with a network;
    communicating with the first networking device with a management system configured to read the first SPI address assigned to the first networking device by the IPsec protocol; and
    generating a network map with an aggregation process executed by the management system wherein the aggregation process keeps track of the first SPI address assigned to the first networking device.

6. The method of claim 5 further comprising:
    assigning a second SPI address to a second networking device in communication with the network; and
    wherein the aggregation process keeps track of the second SPI address assigned to the second networking device and determines if the first SPI address matches the second SPI address; and if a match is determined, updates the network map to show a connection between the first networking device and the second networking device.

7. The method of claim 6 wherein the first networking device comprises a network hub.

8. The method of claim 6 wherein the second networking device comprises a network spoke.

\* \* \* \* \*